UNITED STATES PATENT OFFICE.

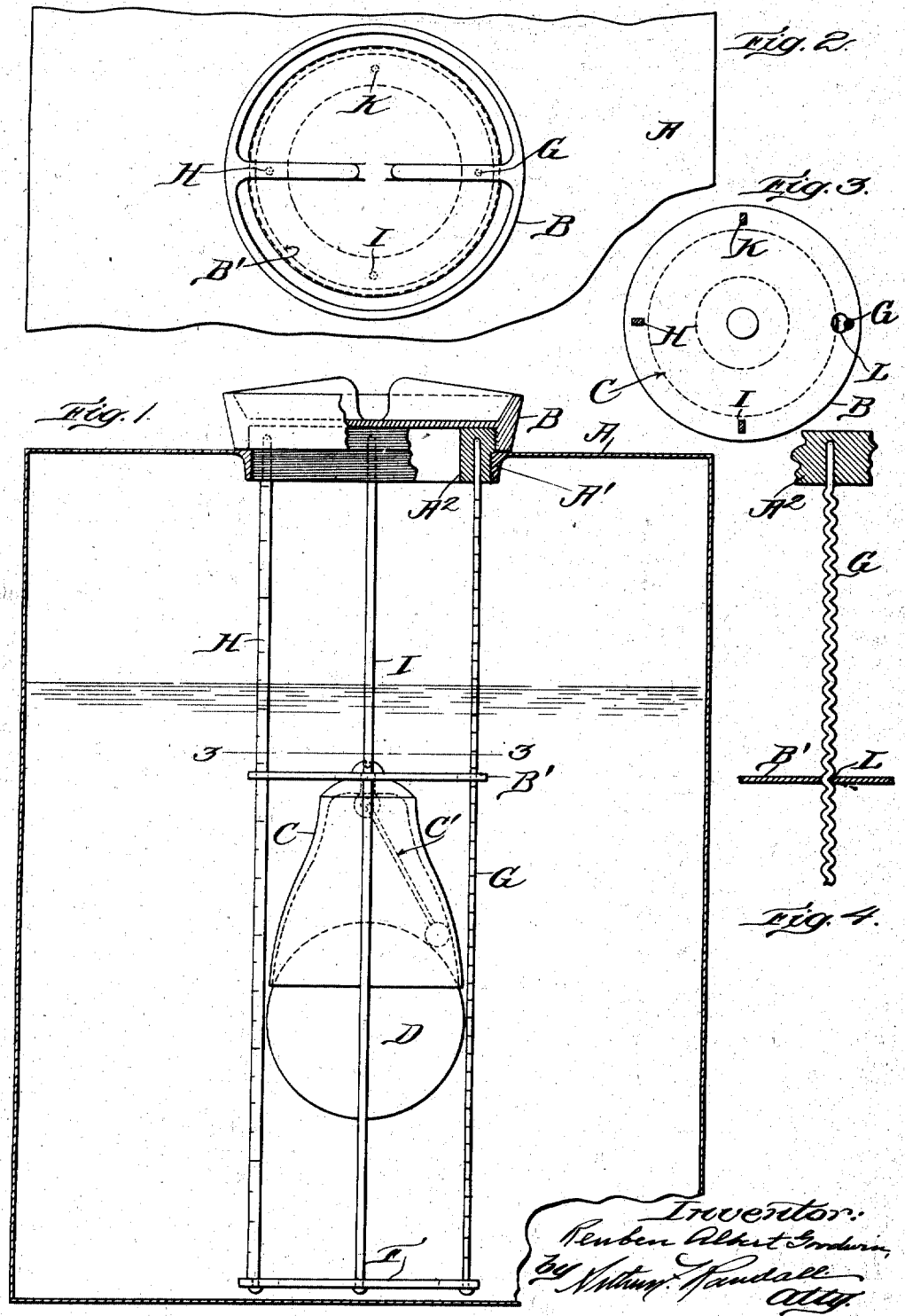

REUBEN ALBERT GOODWIN, OF ATKINSON, NEW HAMPSHIRE.

LIQUID-LEVEL ALARM.

1,280,014.  Specification of Letters Patent.  Patented Sept. 24, 1918.

Application filed October 25, 1915.  Serial No. 57,867.

*To all whom it may concern:*

Be it known that I, REUBEN ALBERT GOODWIN, a citizen of the United States, residing at Atkinson, in the county of Rockingham and State of New Hampshire, have invented certain new and useful Improvements in Liquid-Level Alarms, of which the following is a specification.

This invention relates to liquid level alarms for gasolene tanks, reservoirs and like receptacles, and it has for its object to provide simple and reliable means for automatically and audibly indicating the fact when the level of the liquid in the tank reaches a selected or predetermined height, and particularly to provide an automatic alarm of the character indicated which will be adapted for use on automobiles, motorboats and other motor propelled vehicles to warn or inform the operator when the supply of gasolene or other liquid has reached a predetermined low level.

A further object of the invention is to provide means whereby the device may be arranged or adjusted to sound an alarm at any desired liquid level.

A further object is to provide a construction which may be readily adapted to tanks of different capacities.

In the accompanying drawings:

Figure 1 is a vertical sectional view through a tank or reservoir equipped with a liquid level alarm embodying my invention.

Fig. 2 is a plan view of the same.

Fig. 3 is a section on line 3—3 of Fig. 1.

Fig. 4 is a detail hereinafter described.

Having reference to the drawings, A represents a tank or reservoir provided with a filling opening A' within which is mounted a metal ring A². The ring A² has secured to it the upper ends of four depending rods G, H, I, and K fastened at their lower ends to another metal ring F, said ring A² together with said rods and said lower ring making up a cage within which is arranged a bell or other suitable resonant member C and a spherical float or buoyant member D.

The bell C is herein shown as fastened at its upper end to a metal disk B' formed near its periphery with four holes through which the rods G, H, I and K extend. The hole L through which the rod G extends is a "button-hole" slot, being enlarged at its inner end and relatively narrow at its outer end, the said relatively narrow outer end normally interlocking with the rod G which is made from a length of corrugated wire so as to serve as a supporting rack for the bell carrying disk B'. By pressing the rod G inwardly out of the relatively narrow end of the slot L into the enlarged inner end thereof, the disk B' may be unlocked from said rod and adjusted vertically to position the bell C in accordance with the liquid level at which it is desired the bell shall sound to give the alarm or signal.

The float D is loosely confined within the cage formed by the rods G, H, I and K and so long as the liquid level is above the low level for which the bell C is positioned, said float will occupy a position within the mouth of the bell thereby serving to muffle the latter and also to hold the bell striker C' against operating. In this way the bell is maintained silent so long as the level of the body of liquid within the tank is above the selected or predetermined low level. As the level of the body of liquid within tank A falls the float D is lowered away from the bell so that when the height of the body of liquid reaches the predetermined low level said float is out of contact with the bell and out of the path of the striker C' whereupon the swaying movements imparted to the tank by the movements of the vehicle upon which the tank is mounted, cause the striker to engage the bell and sound the alarm.

The rod H may be marked, as shown, to serve as a gage by means of which the bell C may be positioned to operate and sound the alarm when the supply of liquid within the tank has been reduced to a definite quantity as measured by said gage.

What I claim is:

1. A liquid level alarm having in combination a bell support; a bell mounted on said support; a float occupying a position below said bell and adapted to be held in engagement with the latter by the liquid so as to render the bell inoperative while the level of the liquid is above a predetermined height, and means for guiding the float toward and from said bell.

2. A liquid level alarm having in combination a bell support; a bell adjustably mounted on said support; a float occupying a position below said bell and adapted to be held in engagement with the latter by the liquid so as to render the bell inoperative while the level of the liquid is above a predetermined height; means for guiding the float toward and from said bell, and a gage on said support for use in positioning said bell.

3. In a reservoir for liquids, in combination, a tank; a bell support within said tank; a bell mounted on said support; a float occupying a position below said bell, said float being held in engagement with the latter by the liquid contents of the reservoir so as to render said bell inoperative while the level of the liquid is above a predetermined height and being movable away from said bell with the liquid when the level of the latter falls below said predetermined height, and means for guiding said float toward and from the bell.

4. In a reservoir for liquids, in combination, a tank; a bell support within said tank; a bell; means for holding said bell in position on said support with provision for adjustment vertically; a float occupying a position below said bell, said float being held in engagement with the bell by the liquid contents of said tank so as to render said bell inoperative while the level of the liquid is above a predetermined height and being movable away from said bell with the liquid when the level of the latter falls below said predetermined height, and means for guiding said float toward and from said bell.

In testimony whereof I affix my signature in the presence of two witnesses.

R. ALBERT GOODWIN.

Witnesses:
WM. H. THOMPSON,
MARY R. JONES GOODWIN.